(12) United States Patent
Kwak et al.

(10) Patent No.: US 8,440,347 B2
(45) Date of Patent: May 14, 2013

(54) SECONDARY BATTERY

(75) Inventors: Gun Ho Kwak, Yongin-si (KR); Jeong Man Park, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 328 days.

(21) Appl. No.: 12/588,075

(22) Filed: Oct. 2, 2009

(65) Prior Publication Data

US 2010/0086847 A1    Apr. 8, 2010

(30) Foreign Application Priority Data

Oct. 8, 2008    (KR) .................. 10-2008-0098828

(51) Int. Cl.
*H01M 2/00*    (2006.01)
(52) U.S. Cl.
USPC .................... 429/163; 429/177; 429/175
(58) Field of Classification Search .............. 429/163, 429/175, 177
See application file for complete search history.

(56) References Cited

U.S. PATENT DOCUMENTS

| 5,834,133 | A | 11/1998 | Narukawa et al. |
| 6,432,578 | B1 | 8/2002 | Sugita et al. |
| 2006/0099504 | A1 | 5/2006 | Kim |
| 2006/0246349 | A1 | 11/2006 | Uh |
| 2007/0154796 | A1 | 7/2007 | Uh |

FOREIGN PATENT DOCUMENTS

| JP | 2000-133240 | | 5/2000 |
| JP | 2001-229898 | A | 8/2001 |
| JP | 2006-351471 | A | 12/2006 |
| KR | 10 2004-0026260 | A | 3/2004 |
| KR | 10-2004-0037578 | A | 5/2004 |
| KR | 10-0624957 | B1 | 9/2006 |
| KR | 10 2007-0071233 | A | 7/2007 |

*Primary Examiner* — Jane Rhee
(74) *Attorney, Agent, or Firm* — Lee & Morse, P.C.

(57) ABSTRACT

A secondary battery including an electrode assembly, a can accommodating the electrode assembly, a cap assembly sealing the can, and an insulating case interposed between the electrode assembly and the cap assembly and having two facing long side walls and two facing short side walls, wherein the two facing long side walls include opposing end portions and opposing central portions, the opposing end portions and the opposing central portions each include outer surfaces and a distance between the outer surfaces of the opposing end portions of the long side walls is greater than a distance between the outer surfaces of the opposing central portions of the long side walls.

9 Claims, 4 Drawing Sheets

SECONDARY BATTERY

BACKGROUND

1. Field of the Invention

Embodiments relate to a secondary battery.

2. Description of the Related Art

The recent trend toward weight reduction and high performance of portable electronic devices, e.g., video cameras, cellular phones and mobile computers, has motivated a great deal of research on secondary batteries as power sources for the devices. Secondary batteries may include, e.g., nickel-cadmium batteries, nickel-hydrogen batteries, nickel-zinc batteries and lithium secondary batteries. Lithium batteries are widely used in state-of-the-art electronic devices due to their, e.g., rechargeability, smaller size, larger capacity, higher operating voltage and higher energy density per unit weight.

A typical lithium battery is fabricated by accommodating an electrode assembly, including a positive electrode plate, a negative electrode plate and a separator, together with an electrolyte in a can. Then, the upper opening of the can is closed with a cap assembly to seal the can. An insulating case may be inserted into the can to prevent a short between the cap assembly and the electrode assembly.

SUMMARY

Embodiments are therefore directed to a secondary battery, which substantially overcome one or more of the problems due to the limitations and disadvantages of the related art.

It is therefore a feature of an embodiment to provide a secondary battery that is stably seated in the can without being undesirably withdrawn from the can.

It is therefore another feature of an embodiment to provide a secondary battery constructed such that an insulating case is inserted into a can without leaving any imperfections, e.g., burrs, on inner surfaces of the can.

At least one of the above and other features and advantages may be realized by providing a secondary battery including an electrode assembly, a can accommodating the electrode assembly, a cap assembly sealing the can, and an insulating case interposed between the electrode assembly and the cap assembly and having two facing long side walls and two facing short side walls, wherein the two facing long side walls include opposing end portions and opposing central portions, the opposing end portions and the opposing central portions each include outer surfaces and a distance between the outer surfaces of the opposing end portions of the long side walls is greater than a distance between the outer surfaces of the opposing central portions of the long side walls.

Each of the long side walls may have a linear shape in cross section and each of the short side walls may have a circular-arc shape in cross section.

The short side walls may be thicker than the long side walls.

The insulating case may have tapered portions at positions where the long side walls meet the short side walls.

The tapered portions may be angled inwardly toward the long side walls from the short side walls.

The tapered portions may be angled inwardly at an angle of about 1° to about 10°.

The insulating case may have protrusions extending outwardly from the long side walls.

The protrusions may include outer surfaces, the protrusions may be disposed in pairs on opposing outer surfaces of the long side walls and a distance between the outer surfaces of the pairs of protrusions may be greater than a distance between the outer surfaces of the opposing end portions of the long side walls.

Each of the protrusions may extend outwardly from the long side wall at a distance of about 0.075 to about 0.095 mm.

Each of the protrusions may extend outwardly from the long side wall at a distance of about 0.085 mm.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
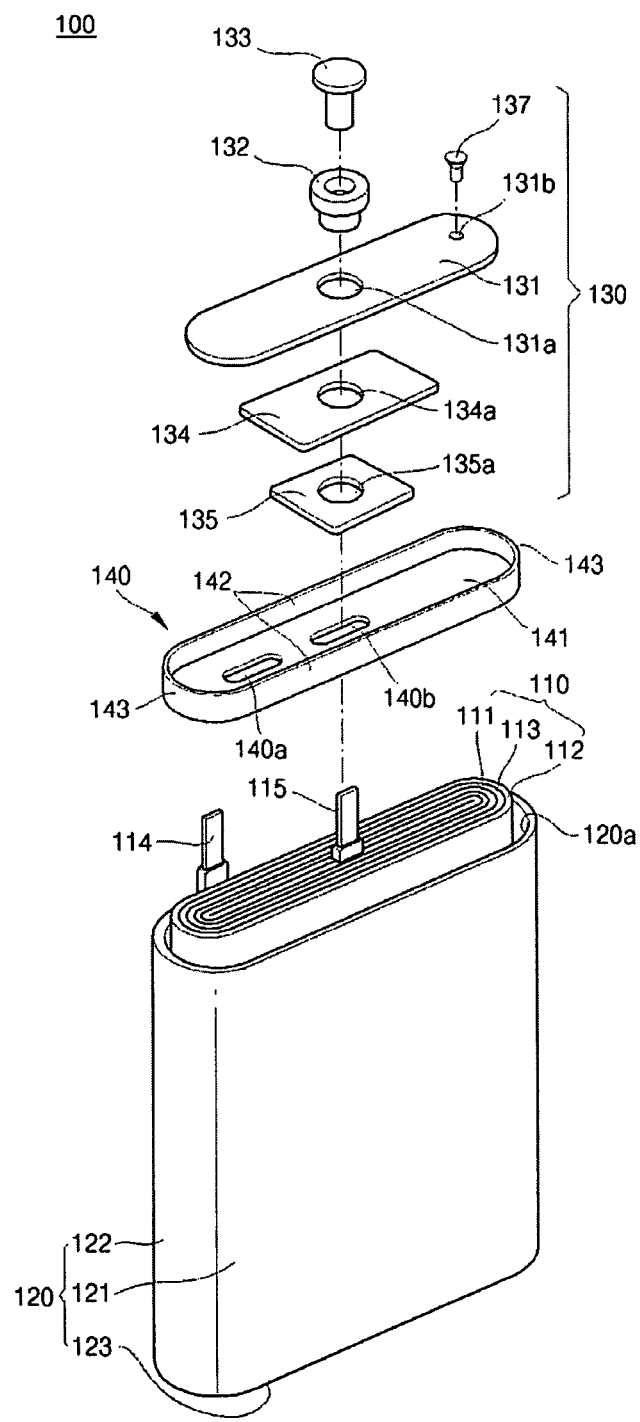
FIG. 1 illustrates an exploded perspective view of a secondary battery according to an embodiment.

Korean Application No. 10-2008-0098828, filed Oct. 8, 2008 in the Korean Intellectual Property Office, and entitled: "Secondary Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Reference will now be made in detail to the present embodiments, examples of which are illustrated in the accompanying drawings, wherein like reference numerals refer to the like elements throughout. The embodiments are described below by referring to the figures.

Figure 2:
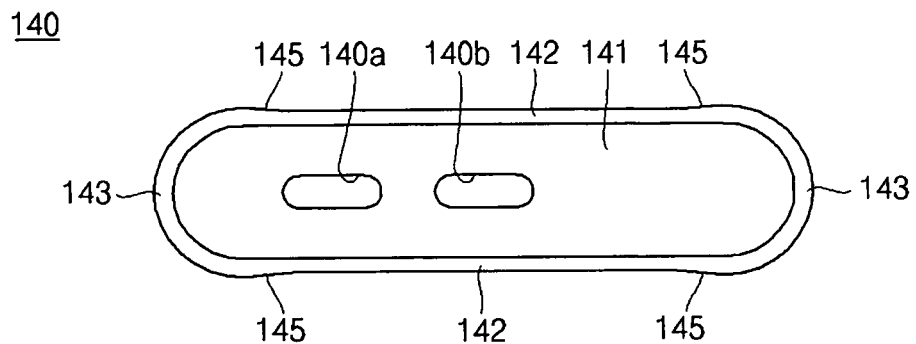
FIG. 2 illustrates a plan view of an insulating case of the secondary battery of FIG. 1.
Figure 3:
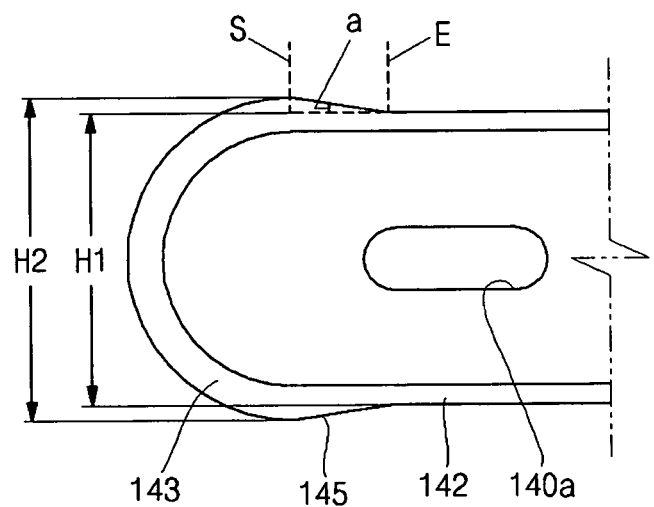
FIG. 3 illustrates a partial enlarged view of a side portion of the insulating case of FIG. 2.
Figure 4:
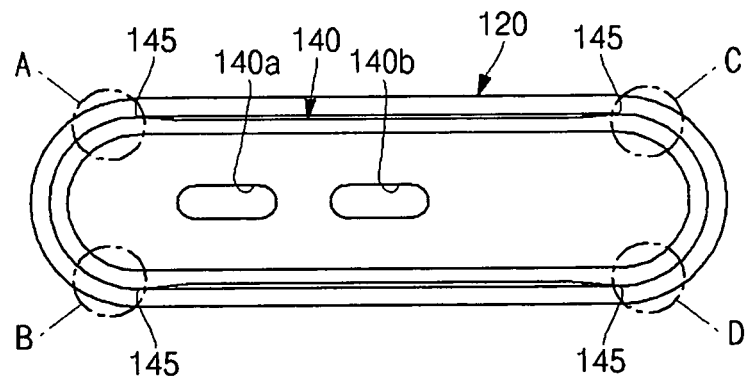
FIG. 4 illustrates a plan view of a state in which the insulating case of FIG. 2 is inserted into a can.

FIG. 1 illustrates an exploded perspective view of a secondary battery according to an embodiment. FIG. 2 illustrates a plan view of an insulating case of the secondary battery of FIG. 1. FIG. 3 illustrates a partial enlarged view of a side portion of the insulating case of FIG. 2. FIG. 4 illustrates a plan view of a state in which the insulating case of FIG. 2 is inserted into a can.

Referring to FIGS. 1 through 3, the second battery 100 may include an electrode assembly 110, a can 120 accommodating the electrode assembly 110, a cap assembly 130 closing an opening of the can 120 to seal the can 120 and an insulating case 140 interposed between the electrode assembly 110 and the cap assembly 130. The electrode assembly 110 may be a laminate of a positive electrode plate 111, a negative electrode plate 112 and a separator 113 interposed between the two electrode plates. The laminate may be rolled in a jelly-roll configuration.

A positive electrode tab 114 may be coupled to the positive electrode plate 111 and may protrude outwardly from the electrode assembly 110. A negative electrode tab 115 may be coupled to the negative electrode plate 112 and may protrude outwardly from the electrode assembly 110. The positive electrode tab 114 may be spaced apart from and electrically insulated from the negative electrode tab 115. The positive electrode tab 114 and the negative electrode tab 115 preferably include nickel, but there is no restriction on the material for the positive and negative electrode tabs.

The can 120 may include, e.g., aluminum or aluminum alloys. The can 120 may be produced by, e.g., deep drawing. The can 120 may have an opening 120a at the upper end thereof, into which the electrode assembly 110 may be inserted. The can 120 may have two long side walls 121, two short side walls 122 and a bottom wall 123 connecting the long side walls and the short side walls.

The cap assembly 130 may include a cap plate 131, a gasket 132, an electrode terminal 133, an insulating plate 134 and a terminal plate 135. The cap plate 131 may be made of, e.g., metal. The cap plate 131 may have a shape that corresponds to the shape of the upper opening 120a of the can 120. The cap plate 131 may have a terminal through-hole 131a disposed at a center thereof. The cap plate 131 may have an electrolyte injection hole 131b disposed at a side of the terminal through-hole 131a. The electrolyte injection hole 131b may be closed with a stopper 137. The positive electrode tab 114 coupled to the positive electrode plate 111 may be welded to the cap plate 131.

The gasket 132 may be a tubular insulating material and may surround the periphery of the electrode terminal 133 when the electrode terminal 133 is inserted into the terminal through-hole 131a. The electrode terminal 133 may be electrically connected to the electrode assembly 110 and may penetrate the cap plate 131, the insulating plate 134 and the terminal plate 135 during assembly of the secondary battery.

The insulating plate 134 may be made of an insulating material, and may be coupled to the lower surface of the cap plate 131. The insulating plate 134 may have a terminal through-hole 134a into which the electrode terminal 133 may be inserted at a position corresponding to the terminal through-hole 131a of the cap plate 131.

The terminal plate 135 may include, e.g., a nickel alloy, and may be coupled to the lower surface of the insulating plate 134. The terminal plate 135 may have a terminal through-hole 135a into which the electrode terminal 133 may be inserted at a position corresponding to the terminal through-hole 131a of the cap plate 131. The terminal plate 135 may be insulated from the cap plate 131 and may be electrically connected to the electrode terminal 133. The negative electrode tab 115 coupled to the negative electrode plate 112 may be welded to a side of the terminal plate 135.

The insulating case 140 may have a rounded rectangular shape in cross section that corresponds to the size of the upper opening 120a. The insulating case 140 may be inserted into the can 120 and may be made of an insulating material.

The insulating case 140 may have a bottom plate 141 and two long side walls 142 and two short side walls 143 surrounding the periphery of the bottom plate 141. The bottom plate 141 may have a substantially rectangular shape corresponding to the size of the upper opening 120a of the can 120. The insulating case 140 may have through-holes 140a and 140b through which the positive electrode tab 114 and the negative electrode tab 140b may penetrate, respectively.

Each of the long side walls 142 may have a linear shape in cross section.

Each of the short side walls 143 may have a circular-arc shape in cross section at both end portions of the long side wall 142.

The short side walls 143 may be thicker than the long side walls 142. This structure of the side walls may be suitable for the formation of tapered portions 145 at positions where the long side walls 142 meet the short side walls 143.

Thus, the tapered portions 145 may be disposed at the end portions of the long side walls 142. The tapered portions 145 may be angled inwardly from the short side walls 143 (starting points S) to the long side walls 142 (end points E).

Due to the formation of tapered portions 145, the distance (H2) between the outer surfaces of opposing end portions of the long side walls 142 may be greater than the distance (H1) between the outer surfaces of opposing central portions of the long side walls 142 (i.e. H1<H2).

The tapered portions 145 may be angled at an angle (a) of about 1° to about 10°. Maintaining the angle (a) at about 1° or greater may help ensure that the end portions of the long side walls 142 contact the inner surfaces of the can 120. Maintaining the angle (a) at about 10° or less may help ensure that the end portions of the long side walls 142 do not interfere with the inner surfaces of the can 120 so that the insulating case 140 may be easily inserted into the can 120.

This angular geometry may make the tapered portions 145 at end portions of the long side walls 142 very close to the four corners of the insulating case 140. Due to this construction, the insulating case 140 may be maintained in intimate contact with the four corners of the can 140.

The assembly and construction of the secondary battery will be explained with reference to FIG. 4. First, the electrode assembly 110 and the insulating case 140 may be sequentially inserted into the can 120. Then, the upper opening 120a of the can 120 may be closed with the cap assembly 130 to seal the can 120. After an electrolyte is injected into the can 120 through the electrolyte injection hole 131b of the cap plate 131, the electrolyte injection hole 131b may be closed with the stopper 137.

In the course of inserting the insulating case 140 into the can 120, the insulating case 140 may be brought into intimate contact with the inner surfaces of the can 120 by the tapered portions 145 disposed at the four corners A, B, C and D thereof.

The insulating case 140 may be fully inserted into the can 120 and be positioned on the upper surface of the electrode assembly 110. Further, the end portions of the long side walls 142, on which the tapered portions 145 may be formed, may be in contact with the four corners A, B, C and D of the inner surface of the can 120 so as not to leave gaps therebetween. As a result, the insulating case 140 may be stably maintained in a fixed state with the can 120 without being undesirably withdrawn from the can 120.

Figure 5:
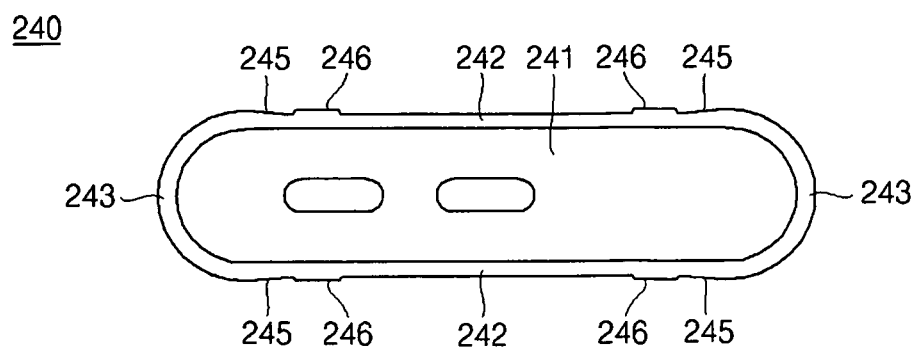
FIG. 5 illustrates a plan view of an insulating case of a secondary battery according to another embodiment.
Figure 6:
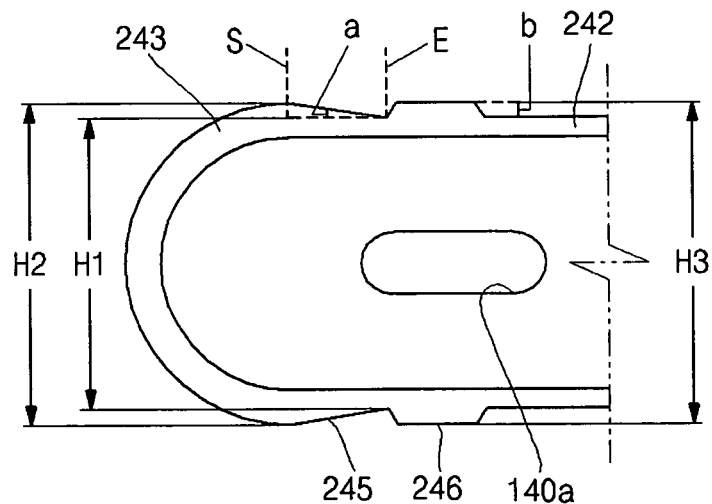
FIG. 6 illustrates a partial enlarged view of a side portion of the insulating case of FIG. 5.
Figure 7:
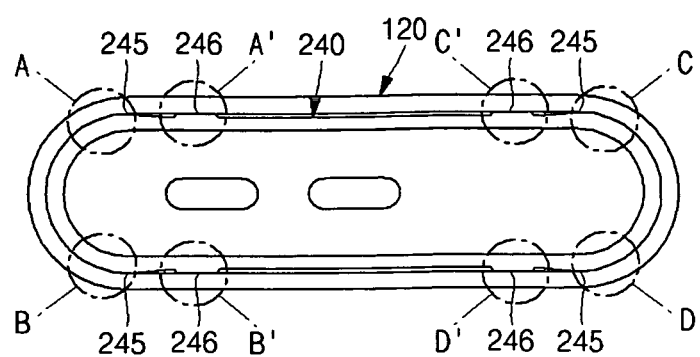
FIG. 7 illustrates a plan view of a state in which the insulating case of FIG. 5 is inserted into a can.

FIG. 5 illustrates a plan view of an insulating case of a secondary battery according to another embodiment. FIG. 6 illustrates a partial enlarged view of a side portion of the insulating case of FIG. 5. FIG. 7 illustrates a plan view of a state in which the insulating case of FIG. 5 is inserted into a can. Referring to FIGS. 5 and 6, the secondary battery includes an electrode assembly 110, a can 120, a cap assembly 130, and an insulating case 240 interposed between the electrode assembly 110 and the cap assembly 130.

The structure of the electrode assembly 110, the can 120 and the cap assembly 130 are the same as those in the above embodiment; and repeated detailed description is omitted. In the drawings, the same elements are denoted by the same reference numerals even though they are depicted in different drawings.

The secondary battery of the present embodiment may be distinguished from that of the previous embodiment in that the insulating case 240 may be modified in shape. The insulating case 240 may have a rounded rectangular shape in cross section that corresponds to the size of the upper opening 120a. The insulating case 240 may be inserted into the can 120, and may be made of an insulating material.

The insulating case 240 may have a bottom plate 241 and two long side walls 242 and two short side walls 243 surrounding the periphery of the bottom plate 241. Each of the long side walls 242 may have a linear shape in cross section and each of the short side walls 243 may have a circular-arc shape in cross section. The short side walls 243 may be thicker than the long side walls 242.

Tapered portions 245 may be formed at the end portions of the long side walls 242. The tapered portions 245 may be angled inwardly from the short side walls 243 (starting points S) to the long side walls 242 (end points E). Due to the formation of tapered portions 245, the distance (H2) between the outer surfaces of the opposing end portions of the long side walls 242 may be greater than the distance (H1) between the outer surfaces of opposing central portions of the long side walls 242 (i.e. H1<H2). The tapered portions 245 are preferably inclined at an angle (a) of about 1° to about 10°.

The insulating case 240 may include protrusions 246 extending outwardly from the long side walls 242 to press-fit into gaps between the long side walls 242 of the insulating case 240 and the inner surfaces of the can 120. The distance (H3) between the outer surfaces of opposing portions of the long side walls from which the protrusions 246 extend may be greater than the distance (H2) between the outer surfaces of the opposing end portions of the long side walls (i.e. H3>H2).

Each of the protrusions may extend outwardly at a distance (b) of about 0.075 to about 0.095 mm from the corresponding long side wall 242. Maintaining the distance (b) at about 0.095 mm or less may help ensure that the protrusions 246 do not leave burrs on inner surfaces of the can 120. Maintaining the distance (b) at about 0.075 mm or more may help ensure that the inner surfaces of the can 120 may be supported by the respective protrusions 246.

The distance (b) is preferably about 0.085 mm. In the preferred case, the insulating case 240 may be inserted into the can 120 without leaving burrs, and the inner surfaces of the can 120 may be stably supported by the insulating case 240.

The assembly and construction of the secondary battery according to the present embodiment will be explained with reference FIG. 1 and FIG. 7. First, the electrode assembly 110 and the insulating case 240 may be sequentially inserted into the can 120. Then, the upper opening 120a of the can 120 may be closed with the cap assembly 130 to seal the can 120. After an electrolyte is injected into the can 120 through the electrolyte injection hole 131b of the cap plate 131, the electrolyte injection hole 131b may be closed with the stopper 137.

Due to this construction, when the insulating case 240 is inserted into the can 120, the end portions of the long side walls 242 may not leave burrs on inner surfaces of the can 120. At the same time, the protrusions 246 of the insulating case 240 may be inserted without interfering with the can 120.

The insulating case 240 may be fully inserted into the can 120 and be positioned on the upper surface of the electrode assembly 110. Further, the end portions of the long side walls 242 may be in intimate contact with the four corners A, B, C and D of the inner surface of the can 120. The protrusions 246 may be in intimate contact with the can 120 at the four portions A', B', C' and D'. Thus, the end portions and the protrusions 246 of the long side walls 242 may evenly support the inner surfaces of the can 120 by balancing the force applied to the can.

Therefore, the insulating case 240 may be stably seated in a fixed state in the can 120 by the end portions and the protrusions 246 of the long side walls 242 without being undesirably withdrawn from the can 120.

As is apparent from the above description, the secondary battery of these aspects may be constructed such that the insulating case may be stably seated without being undesirably withdrawn from the can, thus achieving improved assemblability. In addition, the secondary battery of an embodiment may be constructed such that the insulating case may be inserted into the can without leaving any imperfections, e.g., burrs, on the inner surfaces of the can, thus achieving high reliability.

A typical insulating case may simply be placed on the upper end of the electrode assembly. This configuration, however, may cause the insulating case to spring out of the can. That is, the insulating case may not be stably seated inside the can. Typical lithium secondary batteries may have a problem associated with the insertion of the insulating case into the can.

When the typical lithium ion battery includes an insulating case that is wider than the upper opening of the can, the insulating case may interfere with the can and leave burrs. The burrs may be impurities during welding of the cap assembly to the upper opening of the can and may thereby cause defects during assembly.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:
1. A secondary battery, comprising
an electrode assembly;
a can accommodating the electrode assembly;
a cap assembly sealing the can; and
an insulating case interposed between the electrode assembly and the cap assembly, the insulating case including two facing long side walls and two facing short side walls, the two facing long side walls and two facing short side walls including inner surfaces and outer surfaces, the two facing long side walls and two facing short side walls forming a continuous raised perimeter extending in a direction toward the cap assembly from a bottom surface of the insulating case;
wherein:
the two facing long side walls include opposing end portions and opposing central portions, and
a distance between the outer surfaces of the facing long side walls at the opposing end portions of the facing long side walls is greater than a distance between the outer surfaces of the facing long side walls at the opposing central portions of the facing long side walls, and a thickness of the short side walls in a direction between the inner surfaces and the outer surfaces of the short side walls is greater than a thickness of the long side walls in a direction between the inner surfaces and the outer surfaces of the long side walls.

2. The secondary battery as claimed in claim 1, wherein each of the long side walls has a linear shape in cross section and each of the short side walls has a circular-arc shape in cross section.

3. The secondary battery as claimed in claim 1, wherein:
the long side walls meet the short side walls at the end portions of the long side walls,
the end portions of the long side walls are between the short side walls and the central portions of the long side walls, and
the end portions of the long side walls are tapered such that a thickness of the end portions in a direction between the inner surfaces and the outer surfaces of the end portions is greatest nearest to the short side walls.

4. The secondary battery as claimed in claim 3, wherein the outer surfaces of the end portions are angled toward the inner surfaces of the end portions between the short side walls and the central portions of the long side walls.

5. The secondary battery as claimed in claim 3, wherein the outer surfaces of the end portions are angled toward the inner surfaces of the end portions at an angle of about 1° to about 10° from a direction parallel to the inner surfaces of the end portions.

6. The secondary battery as claimed in claim 1, wherein the insulating case has protrusions extending outwardly from the long side walls.

7. The secondary battery as claimed in claim 6, wherein:
the protrusions include outer surfaces,
the protrusions are disposed in pairs on opposing outer surfaces of the long side walls, and
a distance between the outer surfaces of the pairs of protrusions is greater than a distance between the outer surfaces of the opposing end portions of the long side walls.

8. The secondary battery as claimed in claim 6, wherein each of the protrusions extends outwardly from the long side wall at a distance of about 0.075 to about 0.095 mm.

9. The secondary battery as claimed in claim 8, wherein each of the protrusions extends outwardly from the long side wall at a distance of about 0.085 mm.

* * * * *